(12) United States Patent
Todd

(10) Patent No.: US 8,276,168 B2
(45) Date of Patent: Sep. 25, 2012

(54) DATA STORAGE MEDIA ACCESSIBILITY IN A MEDIA LIBRARY

(75) Inventor: Christian Allen Todd, Parker, CO (US)

(73) Assignee: Quantum Corporation, San Jose, CA (US)

( * ) Notice: Subject to any disclaimer, the term of this patent is extended or adjusted under 35 U.S.C. 154(b) by 1139 days.

(21) Appl. No.: 12/139,400

(22) Filed: Jun. 13, 2008

(65) Prior Publication Data

US 2009/0313646 A1   Dec. 17, 2009

(51) Int. Cl.
*G11B 17/22* (2006.01)

(52) U.S. Cl. .................. 720/600; 369/30.45; 369/30.49

(58) Field of Classification Search .... 369/30.38–30.42, 369/30.43–30.46, 30.49, 30.63; 720/600
See application file for complete search history.

(56) References Cited

U.S. PATENT DOCUMENTS

| | | | |
|---|---|---|---|
| 2002/0181341 A1* | 12/2002 | Steinhilber | 369/30.39 |
| 2003/0218943 A1* | 11/2003 | Gardner et al. | 369/30.4 |
| 2004/0184364 A1* | 9/2004 | Mueller et al. | 369/30.39 |

* cited by examiner

*Primary Examiner* — Nathan Danielsen
(74) *Attorney, Agent, or Firm* — Roeder & Broder LLP; James P. Broder

(57) ABSTRACT

An apparatus and method for increasing data storage capacity of a media library is disclosed herein. The elevation or vertical clearance of a tray assembly included in the library is configured to permit access of data storage media stored near the floor of the library.

19 Claims, 10 Drawing Sheets

DATA STORAGE MEDIA ACCESSIBILITY IN A MEDIA LIBRARY

BACKGROUND

The present invention relates to tape libraries. More particularly, the present invention relates to accessibility of tape cartridges in tape libraries.

A tape library comprises a plurality of stored tape cartridges that may be accessed by a picker mechanism also included in the tape library. The picker mechanism transports a selected tape cartridge between its storage location and a tape drive capable of performing read/write operations on the tape cartridge. In order to maximize space utilization, one or more vertical tape cartridge magazines may be included in the tape library, each magazine extending from the bottom or floor of the tape library to the top or ceiling of the tape library. Along the floor of the tape library, mechanisms are provided allowing the picker mechanism to move as required to transport tape cartridges between the magazines, tape drive(s), import/export stations, and/or other components required for proper operation of the tape library.

Mechanisms for providing articulation of the picker (also referred to as a picker hand) are constrained by the floor of the tape library. Due to the mechanisms having a certain thickness, such as a cylindrical motor, the picker and its associated mechanism (collectively referred to as a tray assembly) occupies a certain amount of air space above the floor, e.g., the tray assembly has a certain height. Tape cartridge shelves located below approximately the top of the tray assembly are inaccessible. As a result, valuable space for holding tape cartridges is wasted in the tape library.

Thus, it would be beneficial to increase data storage capacity in a data library without increasing the dimensions of the data library. It would be beneficial to provide data storage transport mechanisms in a smaller package without sacrificing performance or increasing costs. It would be beneficial to have data storage transport mechanisms amendable to a variety of gear configurations.

BRIEF SUMMARY

One aspect of the invention relates to a media library. The media library includes at least one storage unit including a first end, a second end opposite the first end, and a plurality of rows between the first and second ends to each house a data storage media. The media library further includes an assembly including a base and a picker. The base is located closer to the first end of the storage unit than the picker. The first end and the base are located parallel to each other. The assembly is operable to access the rows between the first and second ends except a row closest to the first end.

Another aspect of the invention relates to a mechanism for transporting data storage media in a library. The mechanism includes a motor configured to provide actuation to a picker. The mechanism also includes a drive shaft engaging the motor and configured to guide the picker assembly along a vertical direction. The mechanism also includes the picker configured to transport data storage media between at least one storage unit and at least one data access device. The drive shaft is provided between the motor and the picker when the picker is vertically positioned above the motor. A combined vertical clearance of the motor, drive shaft, and picker is equal to or less than a thickness of the data storage device holder included in the storage unit.

Still another aspect of the invention relates to a method for accessing data storage media in a library. The method comprises transporting a data storage media between a second shelf of a data storage unit and a data read/write device using a picker assembly. The data storage unit includes a first shelf located closest to a floor of the library, and the second shelf provided directly above the first shelf.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined by the claims attached hereto.

BRIEF DESCRIPTION OF THE DRAWINGS

The exemplary embodiments will become more fully understood from the following detailed description, taken in conjunction with the accompanying drawings, wherein the reference numeral denote similar elements, in which.

The headings provided herein are for convenience only and do not necessarily affect the scope or meaning of the claimed invention.

DETAILED DESCRIPTION

Described in detail below is an apparatus and method for increasing data storage capacity of a fixed size data media library. Mechanism for accessing and transporting data storage devices or units stored in the library is reduced without any decline in performance. The reduced mechanism is also inexpensive. The overall elevation or clearance required for a picker assembly included in the library is reduced, so as to make accessible data storage space that would otherwise be blocked by the picker assembly.

The following description provides specific details for a thorough understanding of, and enabling description for, embodiments of the invention. However, one skilled in the art will understand that the invention may be practiced without these details. In other instances, well-known structures and functions are not shown or described in detail to avoid unnecessarily obscuring the description of the embodiments of the invention.

Figure 1:
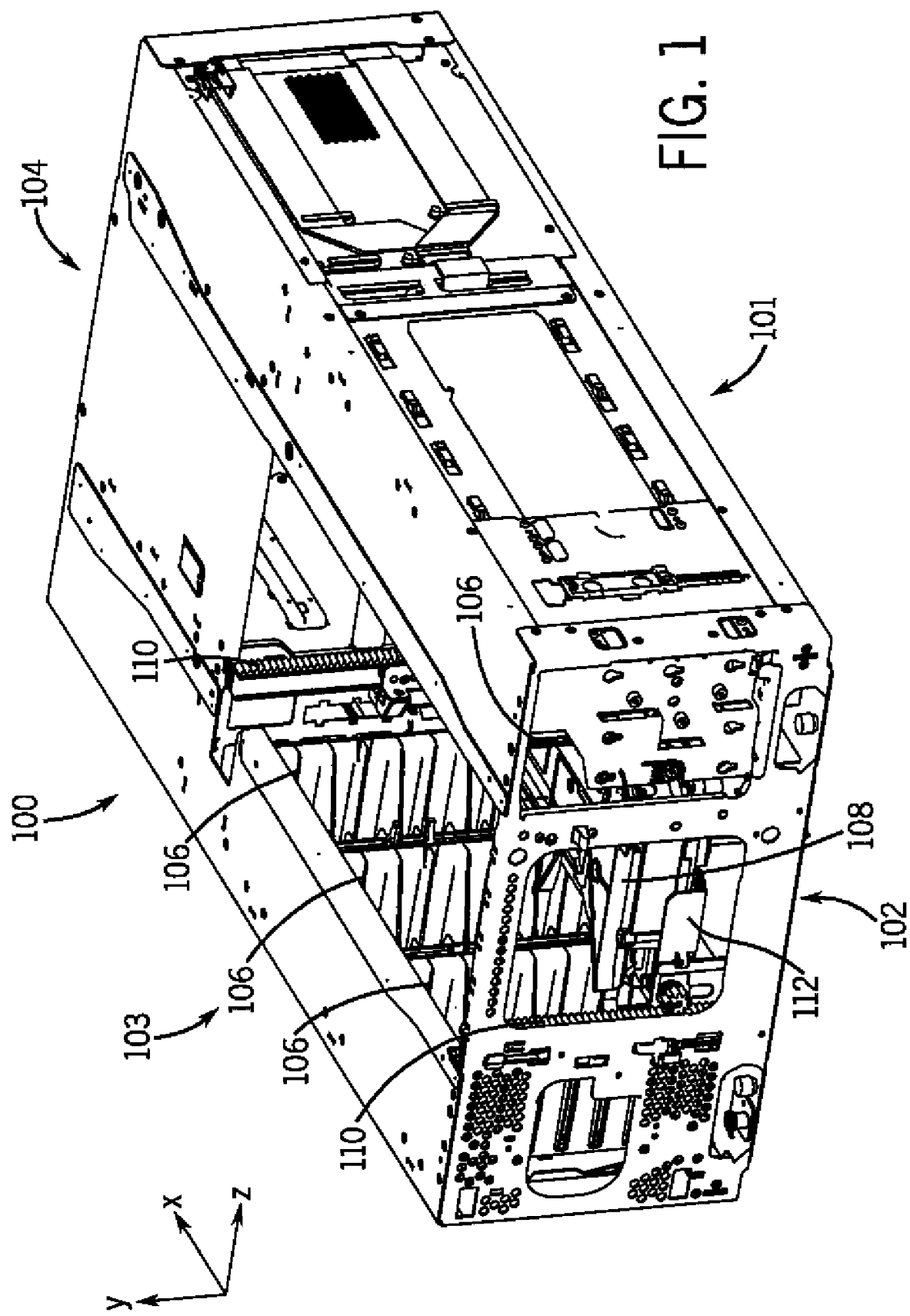
FIGS. 1-3 illustrate a data media library in accordance with embodiments of the present invention.
Figure 2:
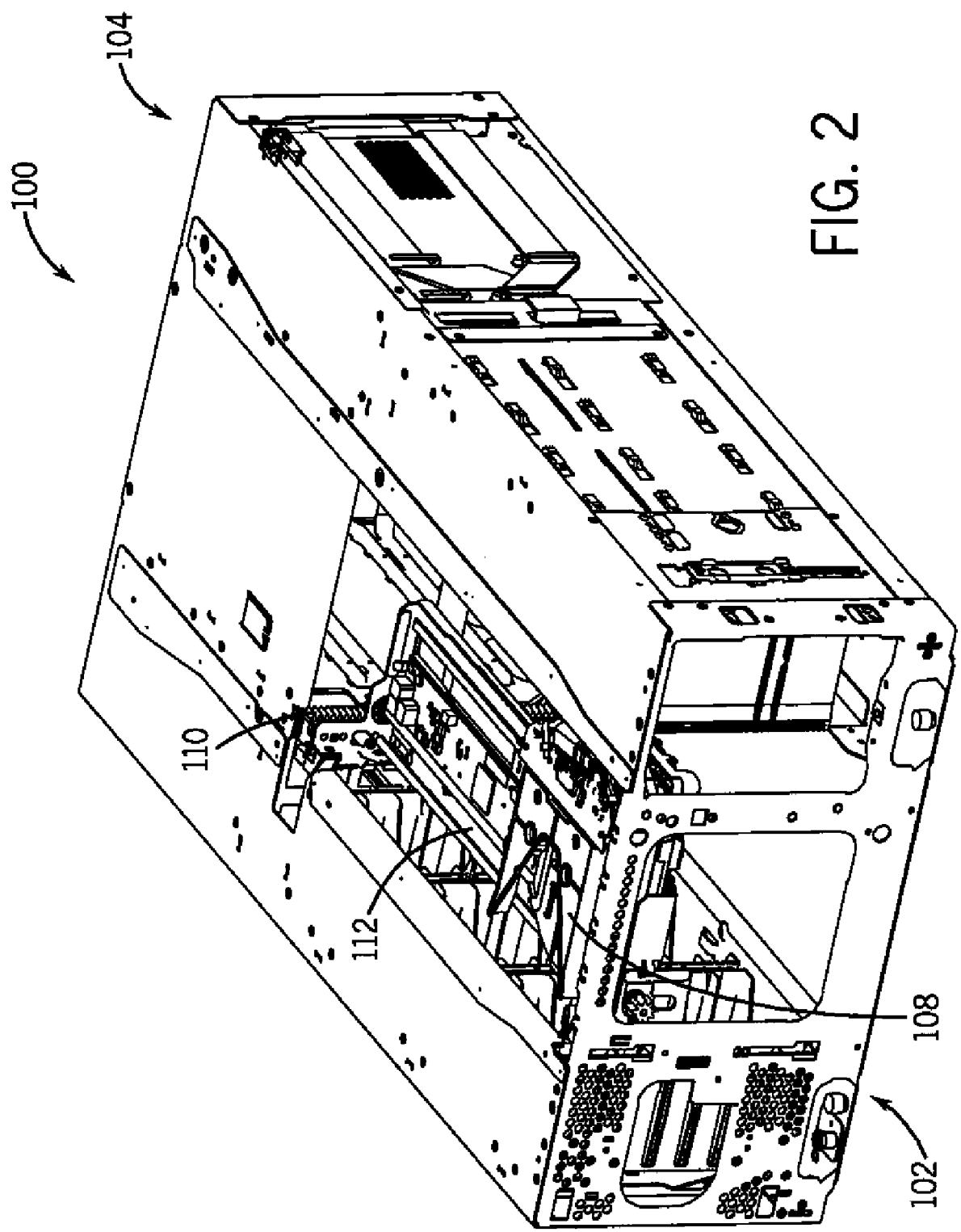
Figure 3:
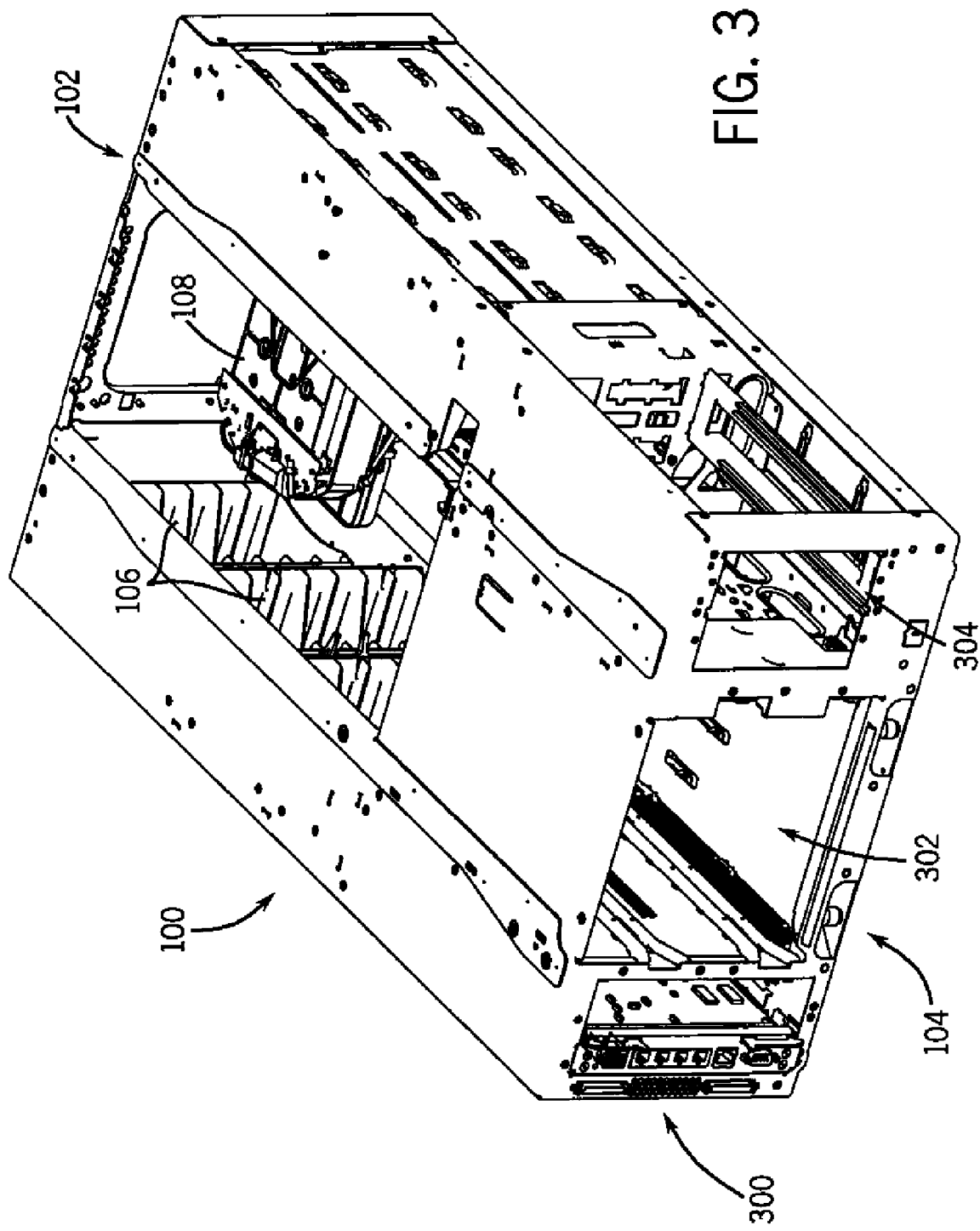

A data storage media library 100 is illustrated in FIGS. 1-3 in accordance with embodiments of the present invention. The library 100 (also referred to as a robotic library) includes a right side 101, a front side 102, a left side 103, and a back side 104. The library 100 further includes a plurality of data storage media magazines 106 (also referred to as holders or storage units) along at least a portion of each of the right and left sides 101, 103. Each of the magazines 106 comprises a vertical stack of shelves. A tray assembly 112 is located between the plurality of magazines 106 and oriented along an x-axis (e.g., from the front side 102 to the back side 104). The tray assembly 112 (also referred to as a climber mechanism, climber assembly, or climber shelf) includes a picker shelf 108. Perpendicular to the major axis of the tray assembly 112 is provided a pair of vertical tracks 110 running along a y-axis (also referred to as a rack gear). The first of the vertical tracks 110 is provided closer to the front side 102 than the back side 104, and the second of the vertical tracks 110 is provided closer to the back side 104 than the front side 102.

The library 100 further includes a control and communications area 300, a data access devices area 302, and a power supply area 304 along the back side 104 (see FIG. 3). The control and communications area 300 is configured to house various electronics, programs, controls, and/or communication links for operating the library 100 and for the library 100 to communicate with the outside world (e.g., other library devices). The control and communications area 300 may include components such as, but not limited to, robotic controller cards, communication cards, and Ethernet ports. The data access devices area 302 is configured to house one or more data access devices. Data storage media removed from the magazines 106 would be transported to the data access device(s) for data read and/or write operations. The power supply area 304 is configured to house one or more power supplies for components within the library 100.

The picker shelf 108 is shown positioned at a floor level in FIG. 1 and above a floor level in FIG. 2. The tray assembly 112 traverses the vertical tracks 110 in order to provide access to different vertical shelves of the magazines 106.

The data storage media may be, but is not limited to, tape based media (e.g., single reel tape cartridges or dual reel tape cartridges), optical media (e.g., CD or DVD), hard or disk drives, solid state memory, or any of a variety of portable data storage media or units. The library 100 is similarly operable to provide storage for a plurality of data storage media, transport data storage media to and from storage to data access devices, perform read/write operations, receive instructions, transmit requested data, and communicate with other libraries or components.

For example, each of the magazines 106 may hold eight single reel tape cartridges. The magazines 106 are located side-by-side at each of the right and left sides 101, 103, for a total of three magazines 106 on each of the right and left sides 101, 103. Taking into account the space taken up by the tray assembly 112, seven cartridges may be accessed per each of the magazines 106, for a total of 42 cartridges per library. The library 100 is also modular and therefore expandable in the vertical direction. As an example, the library 100 is stackable and one or more libraries may be stacked on top of each other.

In alternate embodiments, each of the magazines 106 may hold less or more than eight data storage media. More or less than six magazines 106 may be included in the library 100. The magazines 106 may be located on a single side of the library 100. The data access device(s) may be located opposite the magazines 106. More than one picker shelf 108 and/or tray assembly 112 may be included in the library 100.

Figure 4:
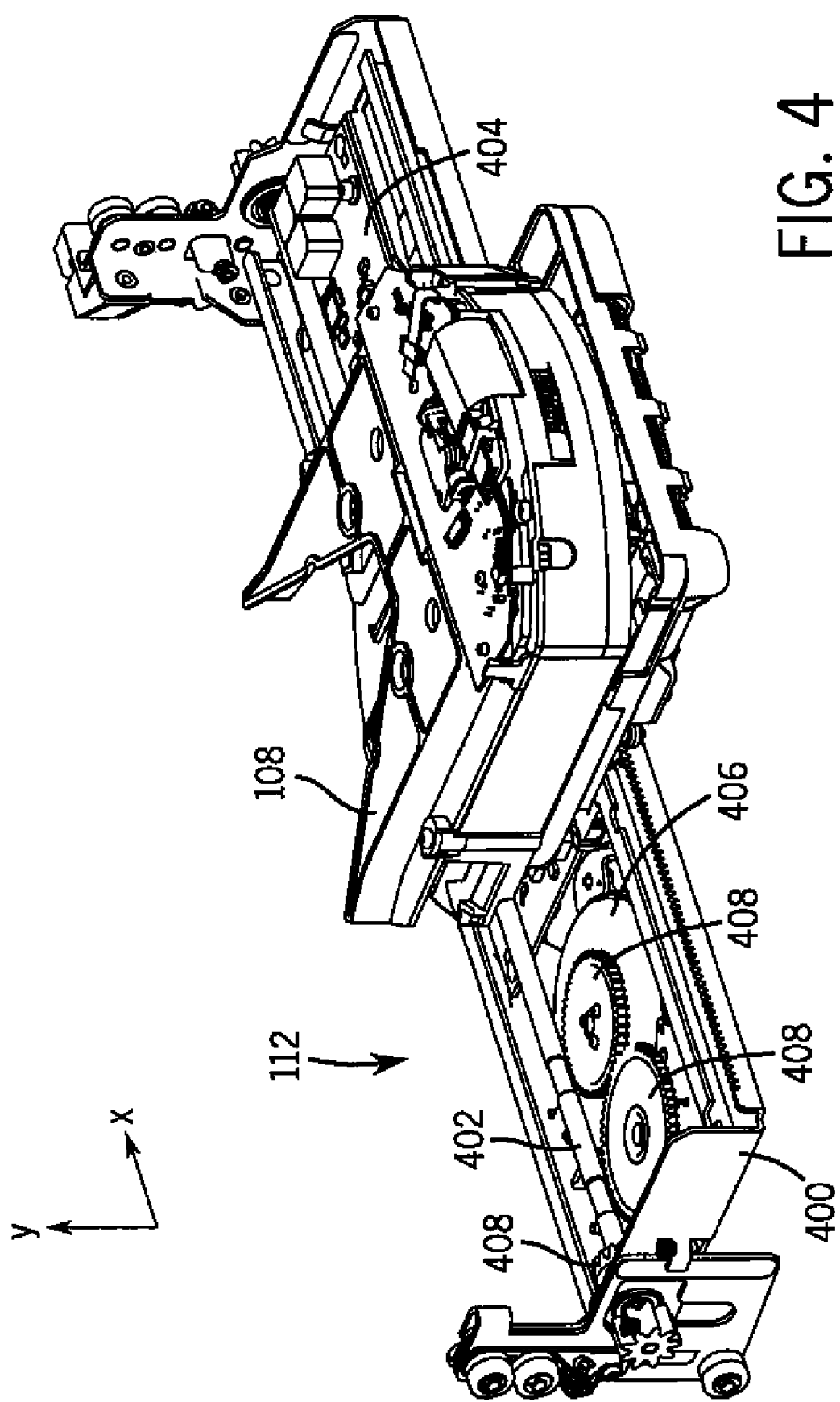
FIGS. 4-8 illustrate a climber shelf included in the library of FIG. 1.

In FIG. 4, the tray assembly 112 is shown removed from the library 100. The tray assembly 112 includes, among other things, a tray 400, a drive shaft 402, a controller board 404, a motor 406, a gear set 408, and a picker assembly. The controller board 404 and motor 406 rests in the tray 400. The tray 400, also referred to as a base, also includes elements (such as vertical sliders, rollers, gears, a cable channel, control cabling, etc.) to facilitate up/down movement of the tray assembly 112. The controller board 404 comprises a servo control board and is configured to receive commands from a library control board (not shown) to initiate picker movement. Although not shown, there are one or more communication links between the controller board 404 and each of the motor 406, picker shelf 108, etc.

The drive shaft 402 is positioned over the motor 406 and controller board 404, and runs along the length of the tray assembly 112. The drive shaft 402 engages the vertical tracks 110 to move the tray assembly 112 in the vertical direction (along the y-axis).

Figure 5:
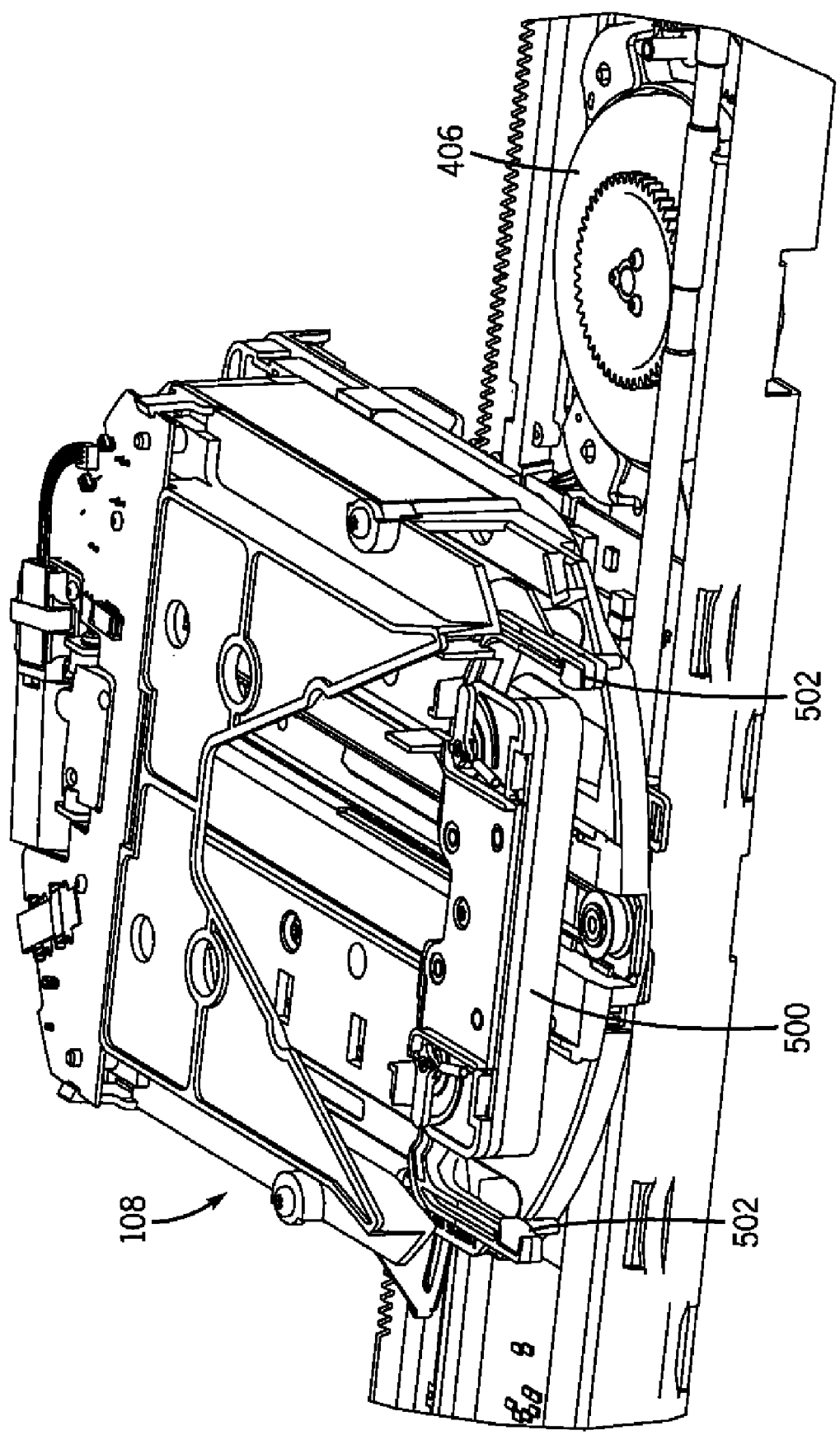

The open side of the picker shelf 108 is illustrated in FIG. 5, from which a picker 500 having a pair of picker fingers 502 is shown. The picker 500, also referred to as a picker robot, is configured to hold a data storage media and transport it between the magazines 106 and a data access device. The picker 500 extends out of the picker shelf 108 (e.g., toward the open side of the picker shelf 108) to pick up or drop off a data storage media, and the picker 500 retracts into the picker shelf 108 (e.g., away from the open side of the picker shelf 108) for the data storage media to be positioned within the picker shelf 108 during transport or to protect the picker 500 when not in use. In alternate embodiments, the picker 500 and the picker shelf 108 may be differently configured as long as they are capable of holding, releasing, and transporting selected data storage media, as appropriate, between the magazines 106 and data access devices.

A picker mechanism including the picker shelf 108 and the picker 500 has freedom of movement in at least three dimensions, front and back along the x axis, up and down along the y axis, and rotationally about the y axis (the picker shelf 108 rotates 90 or 180 degrees to access data storage media at both sides of the tray assembly 112 and to provide the data storage media to the data access devices located at the area 302). The picker 500, the picker shelf 108, and translator(s) for providing horizontal movement (along x axis) and rotational movement (rotation about the y axis) to the picker 500 comprise a picker assembly or a picker translator assembly.

The motor 406 is configured to have minimal height so as to minimize the overall height (or vertical dimension) of the tray assembly 112. The dimensions of the motor 406, in particular its height, reduces the height or vertical clearance required for the tray assembly 112. The vertical dimension of the tray assembly 112 is approximately equal to or less than a height of a shelf of the magazines 106. Thus, one or more of the bottom rows of shelves of the magazines 106 are accessible, increasing actual data storage capacity of the library 100. The motor 406 can be a pancake, disc, or flat motor having a height of approximately 9 millimeters and providing a torque of approximately 36 millinewton meters per amp. For example, the pancake motor may be manufactured by Copal.

For example, if a data storage device comprises a tape cartridge having a thickness of approximately 21 millimeters, then use of the motor 406 can result in the picker shelf 108 being located approximately 30 millimeters above the floor of the library 100 when the tray assembly 112 is at its lowest vertical position. All but the bottom row of the magazines 106 would be accessible by the picker shelf 108. In contrast, using a conventional rotary motor having a height of 33 millimeters results in the picker shelf being located approximately 60 millimeters above the library floor. Anything below this elevation is inaccessible by the picker; accordingly, at least the two bottom rows of each of the magazines are wasted.

Figure 6:
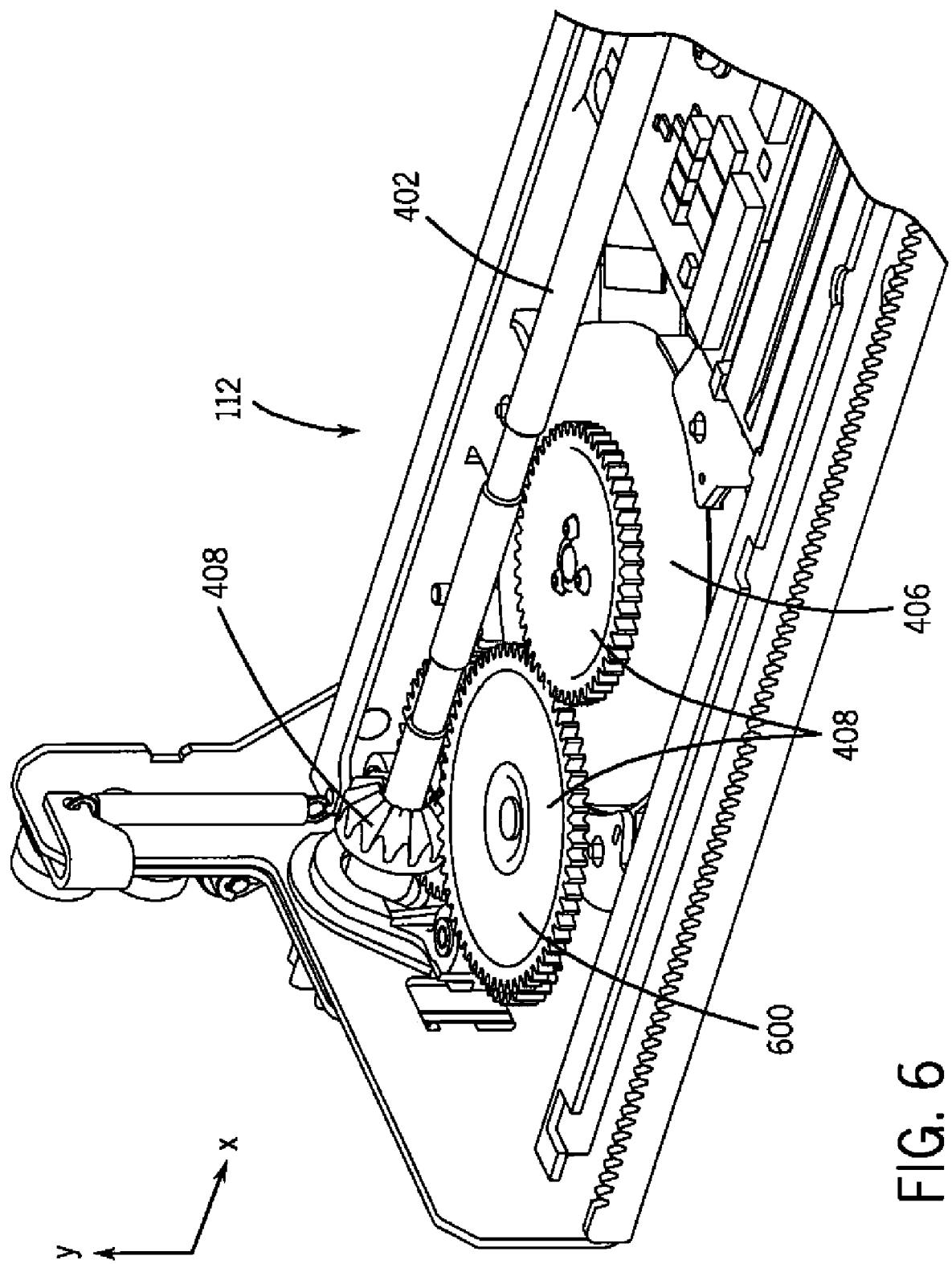
Figure 7:
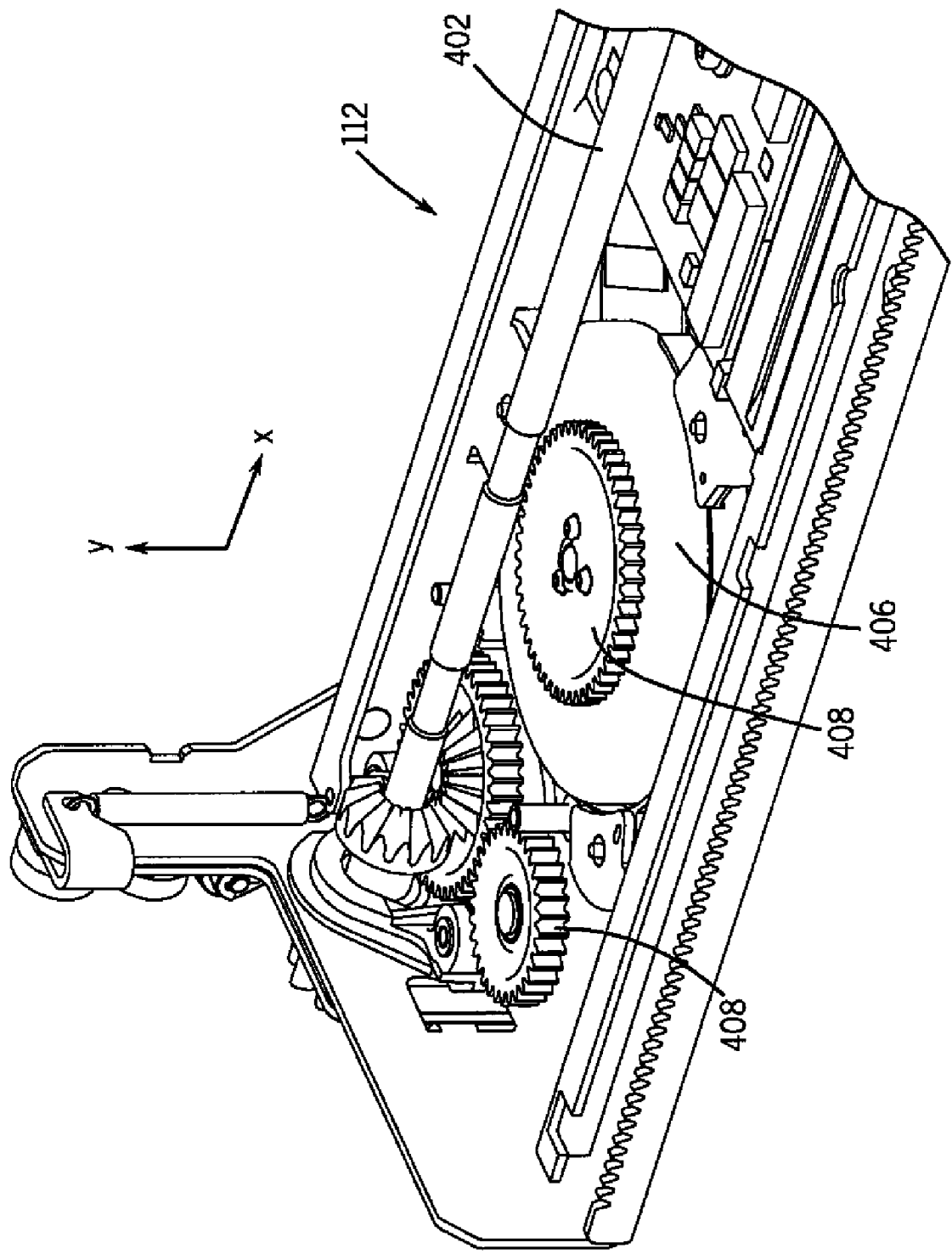
Figure 8:
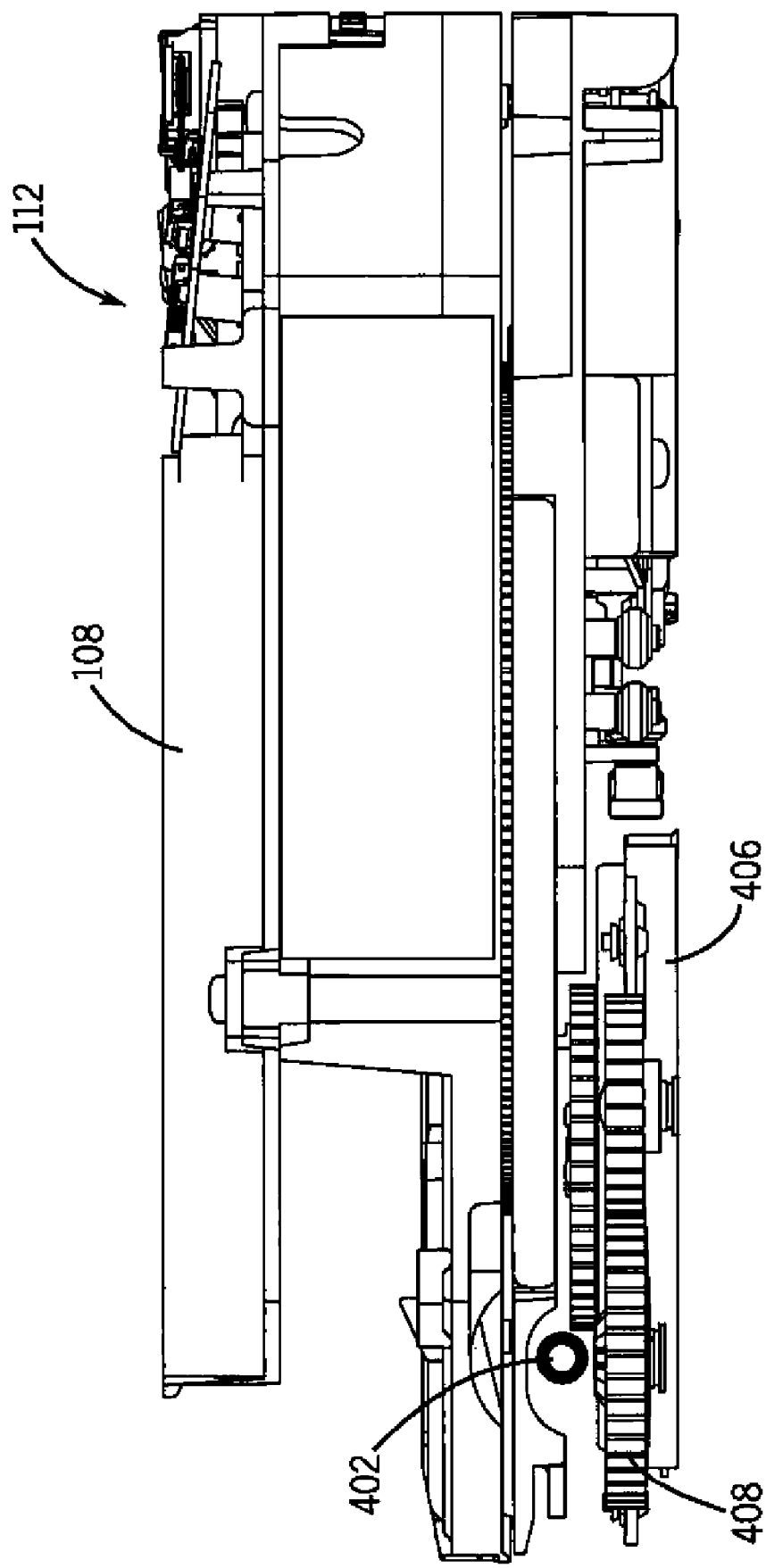

The motor 406 comprises a low profile motor that provides the requisite torque to move the tray assembly 112. The motor 406 and the gear set 408 are shown in greater detail in FIGS. 6-8. The motor 406 engages the drive shaft 402 via the gear set 408 to access data storage devices stored at the magazines 106 in the vertical direction. The gear set 408 is configured to turn the axis of torque generated by the motor 406 by 90 degrees from along the y-axis to the x-axis. In FIGS. 6-8, the gear set 408 comprises a bevel gear set, made up of a plurality of gears that transfer the torque from the motor 406 to the drive shaft 402. FIG. 7 shows the tray assembly 112 with a gear 600 in FIG. 6 removed.

Figure 9:
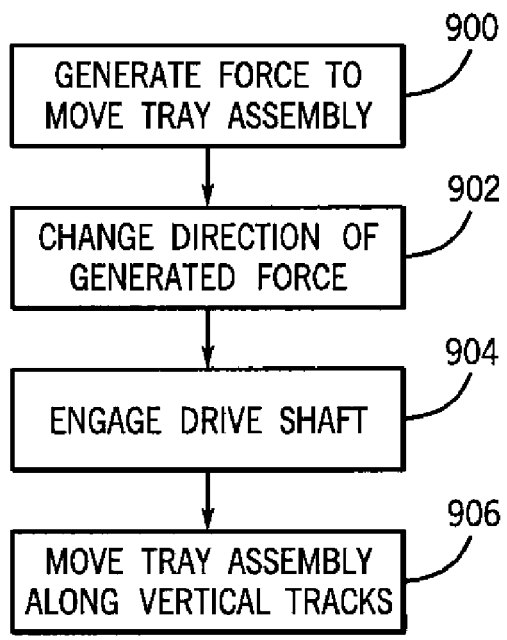
FIG. 9 illustrates a flow diagram of the operation of the climber shelf.

A flow diagram illustrating the operation of the library 100 in accordance with embodiments of the present invention is shown in FIG. 9. In a block 900, a force is generated by the motor 406 to move the tray assembly 112. The direction of torque generated by the motor 406 is changed by the gear set 408 in a block 902. In FIGS. 6-8, the torque generated by the motor 406 is translated toward the end of the tray of the tray assembly 112, and then to the gear in contact with the drive shaft 402 (block 904). The movement of the drive shaft 402 in turn moves the tray assembly 112 along the vertical tracks 110 (block 906).

In alternative embodiments, the tray assembly 112 may be inverted or oriented upside down from those shown in the figures, such that the tray 400 is closer to the ceiling of the library 100 than the picker shelf 108. In this orientation, all rows except the topmost row of shelves of the magazines 106 are accessible.

Figure 10:
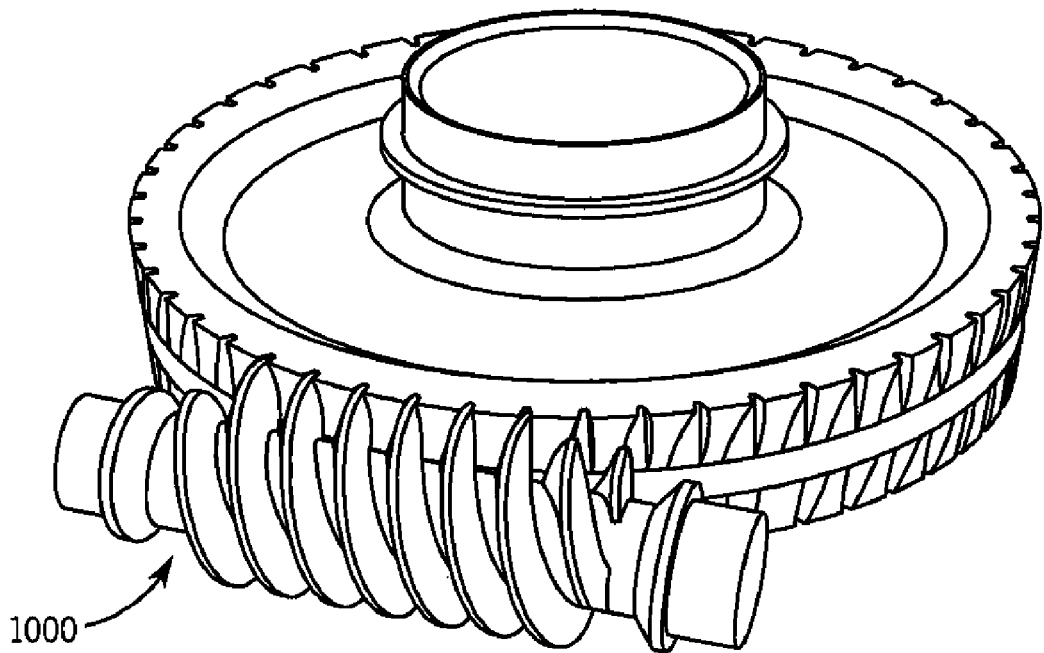
FIGS. 10-13 illustrate alternative drive mechanisms that may be included in the climber shelf.
Figure 11:
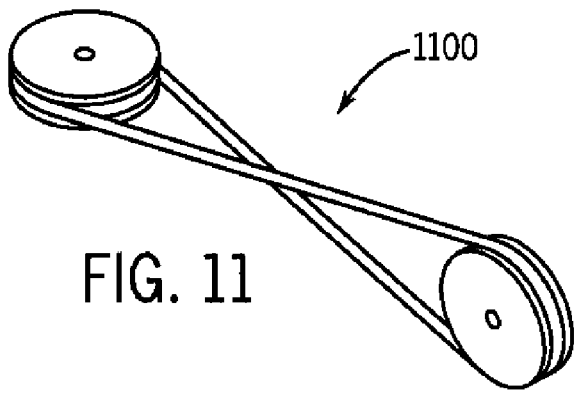
Figure 12:
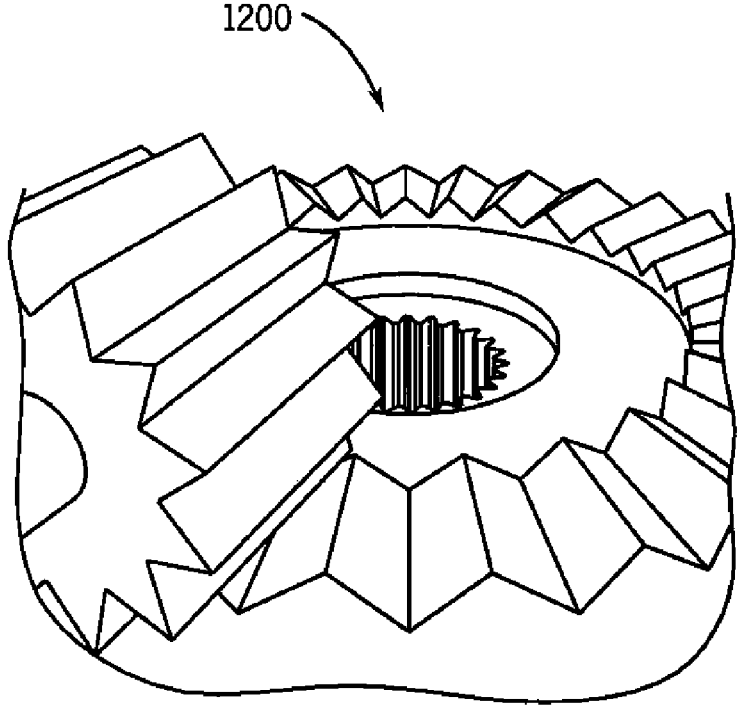
Figure 13:
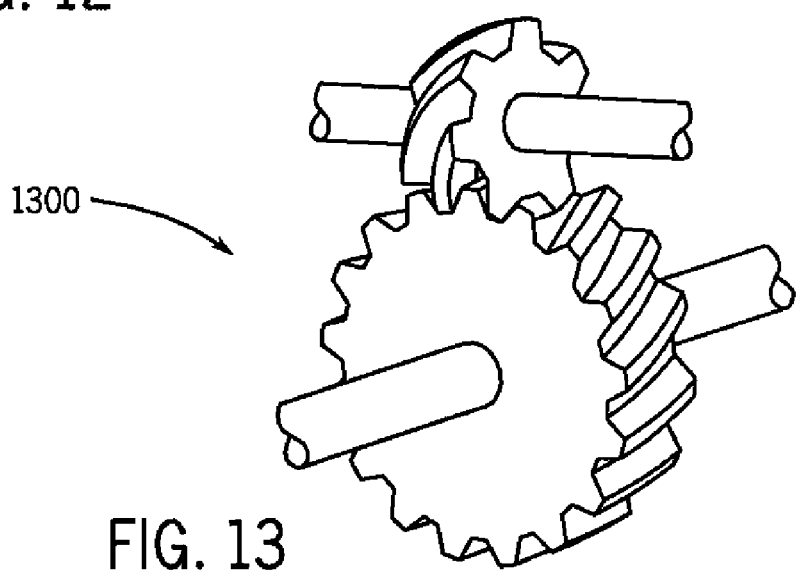

In FIGS. 10-13, alternate embodiments of the drive mechanism are illustrated. In FIG. 10, a gear set 1000 comprising a worm gear is shown. In FIG. 11, a drive mechanism 1100 comprising a twisted belt is shown. In FIG. 12, a gear set 1200 comprising a contrate gear set (crown gear set) is shown. In FIG. 13, a gear set 1300 comprising a helical gear set is shown. Each of gear sets 1000, 1200, 1300 and drive mechanism 1100 is configured to convert the force generated by the motor 406 into an orientation useable for actuating the drive shaft 402.

It is understood that the motor 406 may be implemented in data libraries for axes other than the one discussed above. For example, if a library includes additional moving components not tied to the motor 406, then an additional low profile motor may be implemented to generate the necessary force without taking up precious space within the library. In other cases, a low profile motor may be used for applications other than in data libraries, where low ground clearance would be beneficial.

In this manner, a media library having increased data storage capacity is disclosed herein. A low profile motor, such as a pancake or disc motor, is provided at the floor of a tray assembly along with a gear set to engage a drive shaft oriented parallel to the floor of the library. Due to the low height or thinness of the motor, the overall height or elevation of the tray assembly is approximately that of one row of the data storage device holders. Accordingly, the bottom row of the data storage devices is inaccessible but the remaining rows of the data storage devices are accessible by the picker robot.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination thereof. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

While the invention has been described in terms of particular embodiments and illustrated figures, those of ordinary skill in the art will recognize that the invention is not limited to the embodiments or figures described. One or more aspects of one or more embodiments may be combined to form additional embodiments. The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Therefore, it should be understood that the invention can be practiced with modification and alteration within the spirit and scope of the appended claims. The description is not intended to be exhaustive or to limit the invention to the precise form disclosed. It should be understood that the invention could be practiced with modification and alteration. From the foregoing, it will be appreciated that specific embodiments of the invention have been described herein for purposes of illustration, but that various modifications may be made without deviating from the spirit and scope of the invention.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A mechanism for transporting data storage media in a library, comprising:
   a motor configured to provide actuation to a picker;
   a drive shaft engaging the motor and configured to guide the picker along a vertical direction; and
   the picker configured to transport data storage media between at least one storage unit and at least one data access device, the drive shaft provided between the motor and the picker when the picker is vertically positioned above the motor, and a combined vertical clearance provided for the motor, drive shaft, and picker is equal to or less than a thickness of a data storage device holder included in the storage unit.

2. The mechanism of claim 1, wherein the motor comprises a pancake motor.

3. The mechanism of claim 1, wherein the motor generates a torque having a rotation axis along a vertical direction.

4. The mechanism of claim 1, further comprising a gear set provided between the motor and the drive shaft.

5. The mechanism of claim 1, wherein the combined vertical clearance is approximately 30 millimeters.

6. The mechanism of claim 1, wherein the data storage device holder is configured to hold a data storage device, and the data storage device comprises a tape cartridge.

7. A media library, comprising:
- at least one storage unit including a first end, a second end opposite the first end, and a plurality of rows between the first and second ends to each house a data storage media; and
- an assembly including a base, a picker, and a motor positioned adjacent to the base, the base being located closer to the first end of the storage unit than the picker, the first end and the base being parallel to one another, the motor comprising a pancake motor, and the assembly accessing the rows between the first and second ends except a row closest to the first end.

8. The media library of claim 7 wherein the motor generates a torque having a rotation axis along a vertical direction.

9. A media library, comprising:
- at least one storage unit including a first end, a second end opposite the first end, and a plurality of rows between the first and second ends to each house a data storage media; and
- an assembly including a base, a picker, and a motor positioned adjacent to the base, the base being located closer to the first end of the storage unit than the picker, the first end and the base being parallel to one another, the motor being positioned between the base and the picker, and the assembly accessing the rows between the first and second ends except a row closest to the first end.

10. The media library of claim 9, wherein the first end comprises a floor of the media library.

11. The media library of claim 9, wherein the first end comprises a ceiling of the media library.

12. The media library of claim 9, wherein the data storage media comprises at least one of a single reel tape cartridge, optical media, and hard drive.

13. The media library of claim 9, wherein the motor generates a torque having a rotation axis along a vertical direction.

14. The media library of claim 9, wherein a vertical dimension of the assembly is approximately equal to or less than a vertical height of the row closest to the first end.

15. The media library of claim 9 further comprising a drive shaft engaging the motor and configured to guide the picker along a vertical direction.

16. The media library of claim 15 further comprising a gear set provided between the motor and the drive shaft.

17. A method for accessing data storage media in a library, the method comprising the step of:
- accessing with an assembly each of a plurality rows in at least one storage unit between a first end and a second end opposite the first end except a row closest to the first end, each of the plurality of rows housing a data storage media, the assembly including a base, a picker, and a motor that is positioned between the base and the picker, the base being located closer to the first end of the storage unit than the picker, and the first end and the base being parallel to one another.

18. The method of claim 17 wherein the step of accessing includes the motor generating a torque having a rotation axis along a vertical direction.

19. The method of claim 17 wherein the step of accessing includes the motor comprising a disc motor.

* * * * *